United States Patent
Rubens

[15] 3,673,131
[45] June 27, 1972

[54] PROCESS FOR PREPARING NON-POROUS POLYMERS FROM VINYL MONOMERS

[72] Inventor: Louis C. Rubens, Midland, Mich.
[73] Assignee: The Dow Chemical Company, Midland, Mich.
[22] Filed: Dec. 1, 1969
[21] Appl. No.: 881,283

Related U.S. Application Data

[63] Continuation-in-part of Ser. No. 610,464, Jan. 20, 1967, abandoned.

[52] U.S. Cl. ...................260/2.5 R, 260/2.5 P, 260/88.7 R, 260/88.7 G, 260/91.7, 260/92.8 R, 264/331
[51] Int. Cl. ...................C08f 47/10, C08f 1/04, C08f 3/30
[58] Field of Search.................260/2.5 R, 92.8 R, 88.7, 91.7; 264/331

[56] References Cited

UNITED STATES PATENTS

| | | | |
|---|---|---|---|
| 2,464,062 | 3/1949 | Strain | 260/92.1 |
| 3,311,573 | 3/1967 | Graham et al | 260/2.5 R |
| 3,412,177 | 11/1968 | Griffith | 264/331 |

*Primary Examiner*—Murray Tillman
*Assistant Examiner*—Wilbert J. Briggs, Sr.
*Attorney*—Griswold and Burdick, Albin R. Lindstrom and Ronald G. Brookens

[57] ABSTRACT

This invention relates to a process for preparing glassy, non-porous polymers from vinyl monomers by polymerizing the monomer in the essential absence of water, solvents or gases at a temperature less than about 60° C and under a continuously applied compressive force of at least about 300 psi, and wherein the polymerization reaction is conducted in a reactor which is initially essentially completely filled with the monomer to be polymerized.

2 Claims, No Drawings

PROCESS FOR PREPARING NON-POROUS POLYMERS FROM VINYL MONOMERS

This application is a continuation-in-part of copending application Ser. No. 610,464, filed Jan. 20, 1967, and now abandoned.

It is known that vinyl monomers such as the vinyl halides, vinylidene halides, acrylonitrile and mixtures thereof, form polymers which are not soluble in their monomers; thus these polymers tend to precipitate out of solution from such monomers as they are formed. As the polymerization reaction progresses the polymeric particles form a porous but firm aggregate with the space between the particles filled with monomer. As this monomer polymerizes interparticle voids form which persist and enlarge until the polymerization reaction is completed. The resulting polymers are normally obtained in the form of microporous solids containing as much as 30 percent void volume. It has been found that polymers containing such significant void volume produce articles, such as flow molded films and the like, which are undesirably opaque, are susceptible to swelling when subjected to organic solvents and are generally incapable of being produced in foam form by the incorporation of a conventional blowing agent, e.g. volatile liquid, to the monomeric ingredients prior to polymerization. Further, prior attempts to remove such interparticle voids by the utilization of increased reaction temperature, i.e. temperature in excess of about 60° C, under autogenous pressures, have resulted in undesirable charring and decomposition of the polymeric material.

This invention comprises a process for preparing polymers from vinyl monomer, which polymerize to form polymers insoluble in the monomer, which are glassy and non-porous and which form fabricated articles which are desirably transparent, resistant to swelling in organic solvents and which form uniformly foamed materials by incorporation of conventional foaming agents to the monomeric constituents prior to polymerization thereof.

The process according to the invention is characterized in that the vinyl monomer constituents are polymerized, in the essential absence of water, reaction solvents and gases at a reaction temperature of less than about 60° C, preferably between about 30° and 50° C, while under a continuously applied compressive force of at least about 300 psi, and preferably between about 300 and 20,000 psi and wherein the polymerization reactor is essentially completely filled with the monomer to be polymerized.

The polymers obtained according to this unique process have the desired characteristics as hereinbefore described and, in addition, have molecular weights and physical strength properties equal to that of the polymers that are obtained by means of the known processes of polymerizing in emulsion or in a granular form in suspension.

The invention will be illustrated in greater detail by means of the following specific examples.

EXAMPLE 1

Effect of Compression Upon Vinyl Chloride During Polymerization

Individual samples of vinyl chloride monomer containing 0.5 weight percent lauroyl peroxide were separately sealed inside 0.25 inch diameter tubes 6 inches in length and made from 2 mil thick polyvinyl fluoride film wherein the tubes were essentially completely filled with such monomer. Filling and sealing of the tubes was accomplished at −73° C. The samples were then individually placed in 0.5 inch I.D. steel test tubes containing a mixture of 58 weight percent glycol and 42 weight percent water. These tubes were connected to a high pressure pump to apply a constant compressive force (hydrostatic) to the sample in the film tube. The reactor was heated to 50° C to cause polymerization of the vinyl chloride. Samples were allowed to polymerize for 20 hours.

The following Table I sets forth the characteristics of the polymer samples after removal from the reactor.

| Number | Compressive force applied during polymerization, p.s.i. | Density of the casting (g. cc.$^{-1}$) | Percent voids in the casting | Appearance |
|---|---|---|---|---|
| For Comparison: | | | | |
| 1* | 100 | 1.205 | 14.3 | Opaque, white solid. |
| 2* | 200 | 1.27 | 8.9 | Do. |
| This Invention: | | | | |
| 3 | 300 | 1.32 | 5.7 | Translucent, glassy solid. |
| 4 | 500 | 1.36 | 3.0 | Do. |
| 5 | 1,000 | 1.37 | 2.0 | Do. |
| 6 | 20,000 | 1.40 | .04 | Do. |

*Samples 1 and 2 have the general characteristics of PVC prepared by normal suspension processes.

EXAMPLE 2

Preparation of Expandable PVC Under Compression

A mixture of 79.9 weight percent vinyl chloride, 20 weight percent ethyl chloride and 0.1 weight percent isopropyl percarbonate was sealed in a 0.25 diameter polyvinyl fluoride film tube, wherein such tube was essentially completely filled with such monomer and subjected to 20,000 psi hydrostatic compression for 22 hours at 30° C. The polymer product was flexible, transparent and colorless. This product expanded to a uniform cellular material in 5 minutes in a 140° C oven (foam density of 4 pounds per cubic foot.) Similar expansion to a low density cellular product was observed in one minute in a 27.32 mhz dielectric oven. The foam was tough and stable after cooling to room temperature.

By way of comparison the experiment was repeated as described except that the mixture was polymerized in bulk under autogenous pressure. The resulting product was an opaque solid. When this solid was heat plastified, the ethyl chloride escaped but no foaming occurred.

Another foamable composition was prepared from the following mixture which was subjected to a compressive force of 20,000 psi for 22 hours at 31° C while contained in a completely filled polyvinyl fluoride film tube.

3.05 weight percent oxy-bis benzene sulfonyl hydrazide (a solid, powdered blowing agent)
27.45 weight percent PVC plastisol resin (0.5–2.0 microns)
69.08 weight percent vinyl chloride
0.35 weight percent benzoyl peroxide
0.07 weight percent isopropyl percarbonate In a 140° C oven the blowing agent decomposed and released $N_2$ gas. The heat plastified PVC expanded 6 volumes to a stable, rigid, extremely fine celled tough foam.

EXAMPLE 3

Polymerization of Acrylonitrile Under Compression 0.5% of lauroyl peroxide was dissolved in acrylonitrile monomer. A glass ampoule of 10 cc capacity was partially filled with 7 cc of this mixture and sealed. After 22 hours at 50° C the monomer had polymerized to a hard, opaque white, microporous solid with a density of 0.936 grams/cc. The calculated void volume of the cast sample was 0.2 cc/cc.

By way of comparison, illustrative of the present invention, a second sample of the catalyzed acrylonitrile monomer was sealed in a flexible film tube made from 2 mil thick polyvinyl fluoride. The completely filled 0.30 inch diameter tube was placed inside a 0.50 inch diameter steel tube. Water was pumped into the steel tube to exert a hydrostatic compressive force of 5,000 psi on the contents of the tube. After 22 hours the polyacrylonitrile was recovered as a clear, slightly yellow, non-porous, hard solid resin with a density of 1.17 g/cc at 25° C.

EXAMPLE 4

Polymerization of Vinylidene Chloride Under Compression 0.1% of isopropyl percarbonate (a free radical polymerization initiator) was dissolved in vinylidene chloride monomer.

A glass ampoule of 10 cc capacity was partially filled with 7.6 cc of this monomer and sealed. After 30 hours at 40° C the monomer had polymerized to an opaque, hard microporous solid with a density of 1.43 g/cc. The calculated void volume was 23.8%.

By way of comparison, illustrative of the present invention, a sample of the same monomer composition was polymerized at 40° C for 30 hours in a flexible polyvinyl fluoride container wherein such tube was essentially completely filled with the monomer in the manner described in Example 1. The pressure maintained during polymerization was 10,000 psi. The polymer obtained in this manner had a density of 1.87 g/cc; it was glassy, non-porous, and somewhat hazy in appearance.

It is to be understood that this invention contemplates the utilization of any vinyl monomer, or mixture thereof, which forms polymers which are insoluble in their monomers. The invention further contemplates the utilization of any conventional polymerization initiating agent such as the organic peroxides as well as high energy radiation, e.g. gamma or X-rays. It is also to be understood that the inventive process contemplates the utilization of compressive forces in excess of about 20,000 psi, although practical utilization of this process generally calls for the use of the lowest pressures required to obtain the desired products.

What is claimed is:

1. A process for preparing essentially nonporous polymers from vinyl monomers selected from the group consisting of vinyl halides, vinylidene halides and acrylonitrile, said process consisting of polymerizing said monomers in the essential absence of water, solvents and gases at a temperature of less than about 60° C while under a continuously applied compressive force of at least 300 psi to prevent the formation of interparticle voids in the polymer being formed, and wherein the polymerization is conducted in a reactor which is initially essentially completely filled with said monomers.

2. The process of claim 1 containing in addition thereto and in combination therewith the addition of a blowing agent to said vinyl monomers prior to polymerization thereof.

* * * * *